United States Patent Office 3,695,952
Patented Oct. 3, 1972

3,695,952
SOLID PROPELLANT COMPOSITIONS CONTAINING HYDROXYMETHYL-TERMINATED POLYDIENES
Henry C. Allen, Decatur, Ala., assignor to the United States of America as represented by the Secretary of the Army
No Drawing. Filed Apr. 30, 1964, Ser. No. 364,890
Int. Cl. C06d 5/06
U.S. Cl. 149—19                    8 Claims The invention described herein may be manufactured by and for the government, for government purposes, without the payment of royalty thereon.

This invention relates to improved solid rocket propellant compositions. Particularly, the invention relates to improved composite solid rocket compositions, the improvement therein being the utilization of a cured hydroxymethyl-terminated polydiene as a combination binder and fuel. As used herein, the term "polydiene" is intended to designate the 1,4-addition polymers of the conjugated aliphatic dienes.

Basically, a composite solid rocket propellant consists essentially of a cured, intimate admixture of an organic polymer and an oxidizer, the oxidizer generally being a powdered inorganic oxidizing salt. In addition to these two major constituents, the composition may contain small amounts of curing agents, accelerators, crosslinking agents, and plasticizers used in the curing of the polymer. Moreover, burning rate modifiers, fillers, dyes, and high energy fuels such as various powdered metals and/or their hydrides can be incorporated into the composition if desired.

The polymer is probably the most important single ingredient in the composition. Powdered oxidizers, burning rate modifiers, high energy fuels, and the like are thoroughly mixed with a liquid organic polymer and the polymer subsequently cured. Thus the cured polymeric matrix has embedded therein and rigidly dispersed substantially uniformly therethrough the oxidizers, fuels, and modifiers. At this time, the cured polymer serves as a binder for the remaining ingredients of the composition. Upon ignition, the binder also functions as a fuel component during the combustion process. The cured polymer thus imparts the mechanical properties (e.g., flexibility, elasticity, hardness, toughness) to the composition. Moreover, since the polymer is a fuel component (and may be the only fuel component), the specific impulse and other functions of the burning process depend directly on the combustion properties of the polymer.

Prior to the present invention the most advanced polymeric binders were the carboxy-terminated polybutadienes. The curing agents for the carboxy terminal groups were limited to two groups: those containing the oxirane ring (epoxy group) and those containing the aziridine ring. Experience has shown that propellant compositions utilizing a carboxy-terminated polybutadiene cured with either of these two groups suffered from at least two of the following defects:

(a) Post-cure hardening occurs at high temperatures (e.g. 120° F. to 150° F.) upon prolonged standing.

(b) Deterioration of the propellant occurs upon prolonged standing at these same high temperatures resulting in excessive softening and deformation of the propellant grain.

(c) The curing reaction is very slow at normal curing temperatures. This requires that the grain be kept in the curing oven an extended period of time and this in turn slows down the entire production program.

(d) The curing reaction is relatively incomplete and is subject to deleterious side reactions.

(e) Due mainly to (d) above, the mechanical properties of the propellant compositions are not optimum relative to what they could theoretically be if the curing reaction were complete and if there were only negligible side reactions.

It has now been determined that improved solid composite propellant compositions can be prepared by utilizing hydroxymethyl-terminated polydienes cured through a urethane linkage

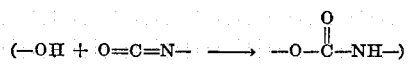

$$(-\text{OH} + \text{O}=\text{C}=\text{N}- \longrightarrow -\text{O}-\overset{\text{O}}{\underset{\|}{\text{C}}}-\text{NH}-)$$

by means of suitable organic polyisocyanate curing agents. These improved compositions do not suffer from any of the above listed defects associated with the similar compositions based on carboxy-terminated polybutadiene. In addition, the average molecular weight of the liquid hydroxymethyl-terminated polymers is from about 2,000 to about 10,000 and is thus ideal for the mixing and casting operations. Moreover, the polydiene basic molecular structure is an excellent fuel and is thus desirable due to the superior ballistic properties it imparts to the rocket during combustion. Furthermore, the reaction involved in the formation of the urethane linkage during curing is superior to other curing methods utilized with propellant compositions. Since the reaction between the active hydrogen of the hydroxyl group and the isocyanate group progresses to substantial completion rapidly at normal curing temperatures without any undesirable side reactions.

In accordance with the foregoing, it is an object of the present invention to provide improved composite solid rocket propellant compositions.

Another object is to provide improved propellant compositions utilizing cured hydroxymethyl-terminated polydienes as a combination binder and fuel.

A further object of the invention is to provide an improved composite solid propellant composition utilizing as a binder/fuel a hydroxymethyl-terminated polydiene cured through the urethane linkage by means of suitable polyisocyanate curing agents.

The manner in which these as well as other objects can be accomplished will become apparent from the following detailed description.

In its basic form, the present invention consists essentially of a cured, intimate admixture of at least one hydroxymethyl-terminated polydiene cured through the urethane linkage and at least one oxidizing agent. The cured polydiene including those ingredients associated with the curing reaction such as the polyisocyanate curing agents, plasticizers, crosslinking agents, and the like will normaly constitute from about 10% to about 50% by weight of the composition and preferably from about 15% to about 30% by weight of the total composition. The remaining portion of the composition will be the oxidizer. The composition can also contain up to about 5% by weight of various dyes, fillers, and burning rate modifiers.

The preferred compositions of the invention are those consisting essentially of a cured intimate admixture of at least one hydroxymethyl-terminated polydiene cured through the urethane linkage, at least one oxidizing agent, and at least one high energy fuel. In this case, the cured polydiene including the herein before mentioned ingredients associated with the curing reaction will normally constitute from about 10% to about 45% by weight of the total composition and preferably from about 15% to about 30%. The high energy fuel will comprise about 5% to about 25% by weight of the composition with the proviso that the combined weights of the high energy fuel and the cured polymer not exceed about 50% by weight of the total composition and preferably not more than 40%. If desired, burning rate modifiers, dyes, fillers, and the like can be incorporated into the compositions in a combined amount of up to about 5% by weight of the total composition (i.e., from 0% to about 5%). The oxidizer constitutes the remainder of the composition, that is from about 45% to about 85% depending on the presence and amounts of the burning rate modifiers, dyes, fillers, and the like. Thus, if the combined weight of the high energy fuel and the polydiene makes up 50% by weight of the composition and if there is the maximum 5% by weight of a dye and/or filler, then the oxidizer will comprise only about 45% of the composition. On the other hand, if the minimum 10% by weight polydiene and 5% by weight high energy fuel are present and there are no burning rate modifiers and the like, then the oxidizer will constitute about 85% by weight of the composition.

The liquid hydroxymethyl-terminated polydienes to be used in making the propellant formulations of the invention are the type described in applicant's co-pending applications: Ser. No. 332,981 filed Dec. 23, 1963 and Ser. No. 335,440 filed Jan. 2, 1964, the latter application being a continuation-in-part of Ser. No. 275,466 filed Apr. 24, 1963. These polymers are structurally represented by the following formulae:

I. 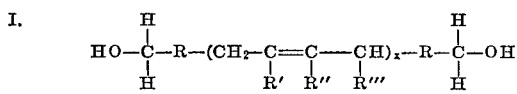

wherein R', R", and R''' are each selected from the group consisting of hydrogen, lower alkyl, lower alkoxy, halo, aryl, lower alkyl substituted aryl, lower alkoxy substituted aryl, halo substituted aryl, and aralkyl; R is tetramethylene, pentamethylene, or hexamethylene; and $x$ is a positive whole number greater than one such that the average molecular weight of the polymer is from about 2,000 to about 10,000 and preferably from about 3,000 to about 5,000.

II. 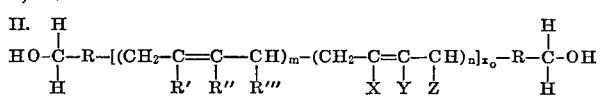

wherein R', R", and R''', X, Y, and Z are each selected from the group consisting of hydrogen, lower alkyl, lower alkoxy, halo, aryl, lower alkyl substituted aryl, lower alkoxy substituted aryl, halo substituted aryl, and aralkyl, the groups

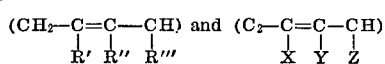

being different; $m$, $n$, and $x_0$ are each positive whole numbers such that the average molecular weight of the polymer is from about 2,000 to about 10,000 and preferably from about 3,000 to about 5,000; and R is tetramethylene, pentamethylene, or hexamethylene.

The liquid polymers corresponding to Formula I above are the preferred binders with those having the following structural formulae being especially preferred:

Ia. 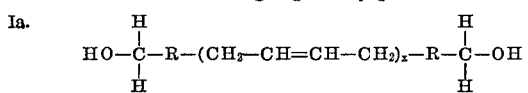

Ib. 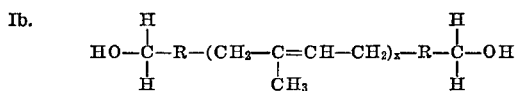

Ic. 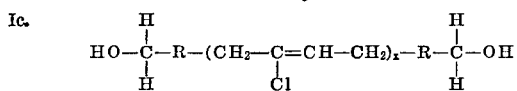

wherein R is pentamethylene and $x$ is as previously defined above. A detailed description of these polymers and several methods for preparing them are set forth in the co-pending applications referred to herein above.

As used in the present specification, the term "lower" when associated with the name of an organic radical such as in lower alkyl and lower alkoxy is intended to limit those radicals to those containing not more than seven carbon atoms. This limitation of seven carbon atoms is not necessarily critical but is used to give a definite meaning to the terminology employed herein.

The polyisocyanate curing agents contemplated by the invention are all commercially available items. Generally, the organic diisocyanates of the formula

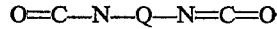

will be used. In this formula, Q represents a divalent organic radical exemplified by alkylene, cycloalkylene, arylene, lower alkyl substituted arylene, and lower alkyl substituted cycloalkylene. Specific examples of suitable diisocyanates are tetramethylene diisocyanate, pentamethylene diisocyanate, hexamethylene diisocyanate, dodecamethylene diisocyanate, 1,3-diisocyanate cyclohexane, p,p'-diphenylmethane diisocyanate, m-phenylene diisocyanate, p-phenylene diisocyanate, 1 - methylphenylene-2,4-diisocyanate, naphthylene - 1,4-diisocyanate, naphthylene-1,5-diisocyanate, m-xylene diisocyanate, p-xylene diisocyanate, dicyclohexylmethane-4,4'-diisocyanate, toluylene diisocyanate, and 3-(alpha-isocyanatoethyl)-phenyl isocyanate. Of course, organic polyisocyanates, containing more than two isocyanate groups can be employed. Examples of these isocyanates are 1,3,5-benzene triisocyanate and p,p',p"-triphenylmethane triisocyanate. The alkylene diisocyanates, particularly hexamethylene diisocyanate, are the preferred curing agents. Of course, mixtures of the polyisocyanates can be used as curing agents.

The polymeric binder exhibits superior mechanical and physical properties if a small amount of a crosslinking agent is incorporated into the composition prior to curing. Any compound having at least 3 active hydrogens, each of which can react with the isocyanate group, can be utilized as a crosslinking agent. Generally the active hydrogen will be a hydroxyl or amino hydrogen. Thus, a compound of the formula M—$(NH_2)_3$, M—$(OH)_3$,

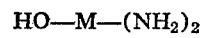

and $(HO)_2$—M—$NH_2$ wherein M is a trivalent organic radical are suitable crosslinking agents. Obviously, those compounds having more than 3 active hydrogens can be used as crosslinking agents. However, the polyhydroxy substituted alkanes comprise the preferred class of crosslinking agents. Examples of suitable crosslinking agents are triethanol amine, trimethylol propane, butane-1,2,4-triol, glycerol, pentaerythritol, and the like. Generally these crosslinking agents will comprise from about 0.05% to about 1.5% by weight of the total composition.

In addition to the crosslinking agents, plasticizers such as dibutyl adipate, dioctyl sebacate, dibutyl phthalate, butyl carbitol formal, triethylene glycol, N-n-butyl acetamide, hydrocarbon oils, and non-functional hydrocarbon liquid polymers can be incorporated into the compositions to alter the mechanical properties as desired. Moreover, stabilizers and antioxidants exemplified by N-phenyl-2-naphthylamine, triphenyl phosphite, di-tertiary butylhydroquinone, alkylated phenols, and reaction products of diphenyl amine and acetone can be utilized in the compositions to lengthen the shelf-life of the propellants.

Any of the conventional powdered inorganic oxidizers for solid composite rocket propellants can be used in the compositions of the invention. These include the powdered inorganic chromates, permanganates, nitrates, chlorates, and perchlorates. The alkali metal perchlorates (particularly potassium perchlorate) and ammonium perchlorate constitute the preferred oxidizers. It should be pointed out that the organic oxidizers (e.g., cyclotrimethylene trinitramine, the tetranitrobutanes, hexanitroethane, pentaerythritol tetranitrate, and mannitol hexanitrate) can be used if they are properly desensitized.

Certain metals and metal hydrides in the form of a powder or short lengths of fine wire strands (e.g., about ¼ inch in length) comprise the preferred group of high energy fuels. Included within this group are beryllium, boron, aluminum, magnesium, lithium, alloys of these metals with each other, magnesium hydride, aluminum hydride, the solid borohydrides such as decaborane and the alkylated decaboranes, and aluminum borohydride. Normally, when these fuels are employed as a powder they will have an average particle size of about 10 microns to about 200 microns although this is not a critical limitation. Aluminum is the preferred high energy fuel additive.

Illustrative of the burning rate modifiers which can be employed in the compositions are ferro ferrocyanide, ammonium ferric ferrocyanide, ferric oxide, ferrocene, silicates, silica, copper chromite, carbon black, lead salicylate, lead stearate, and the like.

The compositions of the present invention are made according to the well known standard techniques for manufacturing solid composite propellant grains. The various ingredients are thoroughly mixed in mechanical mixers and blenders and the resulting mixture is poured into a suitable mold or a rocket motor liner and allowed to cure. The time required for curing will depend on such variables as the particular liquid hydroxymethyl-terminated polydiene employed as the binder, the particular curing agent, the size of the grain, and the curing temperature. However, except in the case of very large grains (i.e., over 20 inches in diameter) the mix should completely cure when allowed to stand for about 48 hours to about 144 hours at a temperature of 100° F. to 150° F. and preferably at about 120° F.

The following examples set forth specific propellant compositions within the scope of the invention.

EXAMPLE 1

A propellant composition is made consisting essentially of 22.17% cured hydroxymethyl-terminated polybutadiene (Formula Ia, average molecular weight of 3300), 0.148% trimethylol propane, 1.56% dioctyl sebacate, 1.184% hexamethylene diisocyanate, and 75.00% ammonium nitrate (all percentages expressing percent by weight of total composition). All the ingredients are thoroughly mixed and poured into a mold. The propellant grain cured completely upon standing 96 hours at 120° F. The grain possessed excellent mechanical properties and the composition did not post-cure or deteriorate upon prolonged standing at 150° F.

EXAMPLE 2

A propellant composition is made consisting essentially of a cured, intimate admixture of 26.58% hydroxymethyl-terminated polyisoprene (Formula Ib, average molecular weight of about 3500), 0.170% trimethylol propane, 1.524% hexamethylene diisocyanate, and 72.00% potassium perchlorate (all percentages referring to percent by weight of total composition) by thoroughly mixing all ingredients and curing in a motor liner for 72 hours at 120° F. Again the propellant exhibited excellent mechanical properties and the composition did not deteriorate or otherwise change after extensive storage at 150° F.

EXAMPLE 3

A solid composite propellant having the following composition is made by thoroughly mixing all the ingredients and thereafter curing the mix in a mold for 72 hours at 125° F.: 19.51% hydroxymethyl-terminated polybutadiene (Formula Ia, average molecular weight of about 4400), 0.131% hexanetriol, 1.37% dibutyl phthalate, 1.08% toluene diisocyanate, 10.00% aluminum powder, and 68% ammonium perchlorate. This propellant grain possessed very good mechanical properties and withstood prolonged storage at 140° F. without any adverse affects.

By substituting other hydroxymethyl-terminated polymers and copolymers for those used in the compositions described in Examples 1 through 3, additional improved propellant compositions can be prepared. Different curing agents, plasticizers, and high energy fuels can also be used. Moreover, the ingredients within the compositions can be varied over the percentage range set forth in the preceding discussion above.

This detailed description of the invention is for the purpose of clarification and illustration only no undue limitation should be attributed to the invention as a result thereof except as reflected in the appended claims.

I claim:

1. A solid composite propellant composition consisting essentially of a cured intimate admixture of at least one hydroxymethyl-terminated polydiene cured through the urethane linkage with at least one organic polyisocyanate curing agent; and at least one powdered inorganic oxidizing agent selected from the group consisting of inorganic chromates, inorganic permanganates, inorganic nitrates, inorganic chlorates, and inorganic perchlorates; said hydroxymethyl-terminated polydiene corresponding to the formula

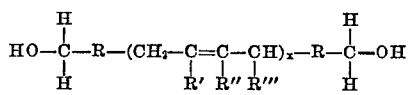

wherein R', R", and R''' are each selected from the group consisting of hydrogen, lower alkyl, lower alkoxy, halo, aryl, lower alkyl substituted aryl, lower alkoxy substituted aryl, halo substituted aryl, and aralkyl; R is selected from the group consisting of tetramethylene, pentamethylene, and hexamethylene; and $x$ is a positive whole number greater than one such that the average molecular weight of said polydiene is from about 2,000 to about 10,000.

2. A solid composite propellant composition consisting essentially of a cured intimate admixture of at least one hydroxymethyl-terminated polydiene cured through the urethane linkage with at least one organic polyisocyanate curing agent; and at least one powdered inorganic oxidizing agent selected from the group consisting of inorganic chromates, inorganic permanganates, inorganic nitrates, inorganic chlorates, and inorganic perchlorates; said hydroxymethyl-terminated polydiene corresponding to the formula

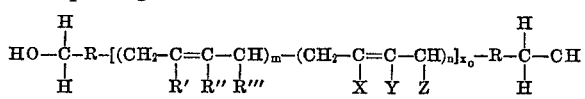

wherein R', R", R''', X, Y, and Z are each selected from the group consisting of hydrogen, lower alkyl, lower alkoxy, halo, aryl, lower alkyl substituted aryl, lower alkoxy substituted aryl, halo substituted aryl, and aralkyl; the groups

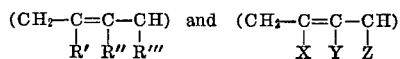

being different; $m$, $n$, and $x_0$ are positive whole numbers such that the average molecular weight of said polydiene is from about 2,000 to about 10,000 and R is selected from the group consisting of tetramethylene, pentamethylene, and hexamethylene.

3. A solid composite propellant composition consisting essentially of a cured intimate admixture of about 10% to about 45% by weight of at least one hydroxymethyl-terminated polydiene cured through the urethane linkage with at least one organic polyisocyanate curing agent; about 5% to about 25% by weight of a high energy fuel selected from the group consisting of beryllium, boron, aluminum, magnesium, lithium, alloys of these metals with each other, magnesium hydride, aluminum hydride, solid borohydrides, and aluminum borohydride with the proviso that the combined weight of said polydiene and said high energy fuel not exceed about 50% by weight of the total composition; and from about 45% to about 85% by weight of an inorganic oxidizer selected from the group consisting of inorganic chromates, inorganic permanganates, inorganic nitrates, inorganic chlorates, and inorganic perchlorates; said hydroxymethyl-terminated polydiene being selected from the group consisting of those corresponding to the formulae

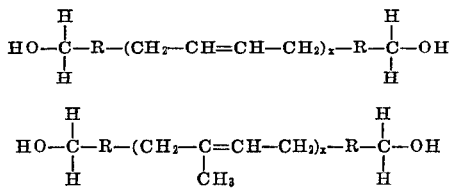

and

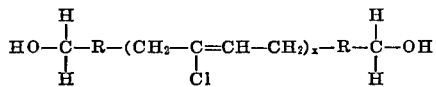

wherein R is pentamethylene and $x$ is a positive whole number such that the molecular weight of said polydiene is from about 2,000 to about 10,000.

4. A composition according to claim 3 wherein $x$ is a positive whole number such that the average molecular weight of said polydiene is from about 3,000 to about 5,000.

5. A composition according to claim 4 wherein said hydroxymethyl-terminated polydiene corresponds to the formula

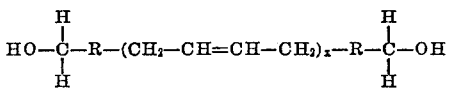

wherein R is pentamethylene.

6. A composition according to claim 4 wherein said hydroxymethyl-terminated polydiene corresponds to the formula

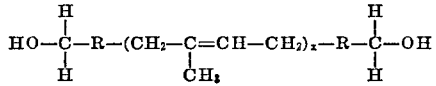

wherein R is pentamethylene.

7. A solid composite propellant composition consisting essentially of a cured intimate admixture of about 15% to about 30% by weight of a hydroxymethyl-terminated polydiene cured through the urethane linkage with a diisocyanate curing agent of the formula

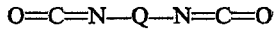

wherein Q represents a divalent organic radical selected from the group consisting of alkylene, cycloalkylene, arylene, lower alkyl substituted arylene, and lower alkyl substituted cycloalkylene; 5% to about 25% by weight of a high energy fuel selected from the group consisting of beryllium, boron, aluminum, magnesium, lithium, alloys of these metals with each other, magnesium hydride, aluminum hydride, solid borohydrides, and aluminum borohydride with the proviso that the combined weight of said polydiene and said high energy fuel not exceed about 50% by weight of the total composition; and from about 45% to about 85% by weight of an oxidizing agent selected from the group consisting of ammonium perchlorate and an alkali metal perchlorate; said polydiene corresponding to the formula

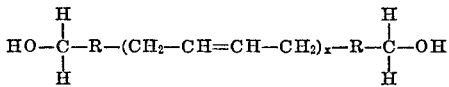

wherein R is pentamethylene and $x$ is a positive whole number such that the average molecular weight of said polydiene is from about 2,000 to about 5,000.

8. The composition according to claim 7 wherein Q is hexamethylene, said high energy fuel is powdered aluminum, and said oxidizing agent is ammonium perchlorate.

References Cited

UNITED STATES PATENTS

| | | | |
|---|---|---|---|
| 3,087,844 | 4/1963 | Hudson | 149—19 |
| 3,132,976 | 5/1964 | Klager | 149—19 |
| 3,177,101 | 4/1965 | Vriesen | 149—19 |

OTHER REFERENCES

Chem. and Eng. News Aug. 8, 1960, p. 63 (TRI 1418).

BENJAMIN R. PADGETT, Primary Examiner

U.S. Cl. X.R.

149—20, 22